United States Patent [19]

Webb

[11] Patent Number: 4,458,955
[45] Date of Patent: Jul. 10, 1984

[54] SUSPENSION ARM FOR UPPER AND LOWER TRACK RUNS

[75] Inventor: William A. Webb, Baltimore County, Md.

[73] Assignee: AAI Corporation, Cockeysville, Md.

[21] Appl. No.: 339,586

[22] Filed: Jan. 15, 1982

[51] Int. Cl.³ .................. B62D 55/10; B62D 55/16
[52] U.S. Cl. .................................. 305/25; 305/27; 305/28
[58] Field of Search .............. 305/22, 24, 25, 27, 305/28

[56] References Cited

U.S. PATENT DOCUMENTS 3,013,843  12/1961  Sinko .......................... 305/22 X
3,374,005  3/1968   Donlon et al. .................. 305/27 X

FOREIGN PATENT DOCUMENTS 208448  5/1956  Australia ............................ 305/25
488848  7/1938  United Kingdom .................. 305/25
640895  1/1979  U.S.S.R. ............................. 305/28

Primary Examiner—David A. Scherbel
Attorney, Agent, or Firm—Reginald F. Pippin, Jr.

[57] ABSTRACT

A tracked vehicle having propulsion imparted by two driven continuous tracks, with a plurality of suspension arms each carrying a road wheel for engagement of the lower traction run of the respective track, and one or more of the suspension arms for each track also carrying a respective return roller for engaging and supporting the return run of the respective track.

11 Claims, 5 Drawing Figures

SUSPENSION ARM FOR UPPER AND LOWER TRACK RUNS

This invention relates to tracked vehicles, and more particularly to tracked vehicles in which one or more track-engaging return rollers are carried on pivoted suspension arms which also carry track-engaging road wheels.

It is conventional practice to employ return rollers on tracked vehicles, to provide support for the upper return run of the track and to reduce the tendency for this return run of the track to whip up and down during propulsion of the vehicle. In a typical conventional road wheel suspension arrangement, the lower or traction run of the track is engaged by a plurality of road wheels each carried by an articulated suspension arm pivotally mounted on the vehicle body or hull, with a respective torsion rod for effecting a pivotal spring action support for each respective pivoted suspension arm. With a torsion rod spring action arrangement for the road wheel suspension arms, the suspension arms may be relatively narrow and compact, thereby providing ample space along the upper or return run of the track for accommodating the fixed mounting of return rollers on the side wall of the vehicle hull for supporting the return run between the front idler and the rear drive sprocket. However, with larger width suspension arms, such as those incorporating a hydropneumatic position-control arrangement within the suspension arm itself, the normally available space for fixed mounting of the return rollers on the body side wall may be taken up by the travel path swept by the suspension arms and their respective road wheels. It remains, however, desirable to provide such return rollers to support the return run of the track and to thereby minimize or reduce whipping motion of the otherwise free and slack upper run during propulsion.

It is a feature of the present invention to provide an articulated mounting for the return rollers of a tracked vehicle, by mounting such on respective ones of the suspension arms.

It is a further feature to provide a suspension arm arrangement for a tracked vehicle to which the suspension arm carries a road wheel for normal engagement with the lower run of the track and a return roller for supporting engagement with the upper return run of the track.

Still a further feature is the provision of a pivoted suspension arm mounted road wheel and return roller arrangement in which the geometry of the road wheel, return roller and suspension arm are such that both the road wheel and return roller effect track contact (bottoming out) with the vehicle sponson or the like preferably at substantially the same angle of suspension arm movement, or in any event where the road wheel causes track and road wheel bottoming out prior to bottoming out by the shorter-radius-mounted return roller with its high mechanical advantage and ability to otherwise effect substantial damage on impact alone, thereby providing an effective upper limit stop for upward suspension arm travel.

Still further objects, features and advantages will become apparent from a reading of the following detailed description of an illustrative preferred embodiment according to the invention, taken in conjunction with the accompanying drawings, wherein.

Figure 1:
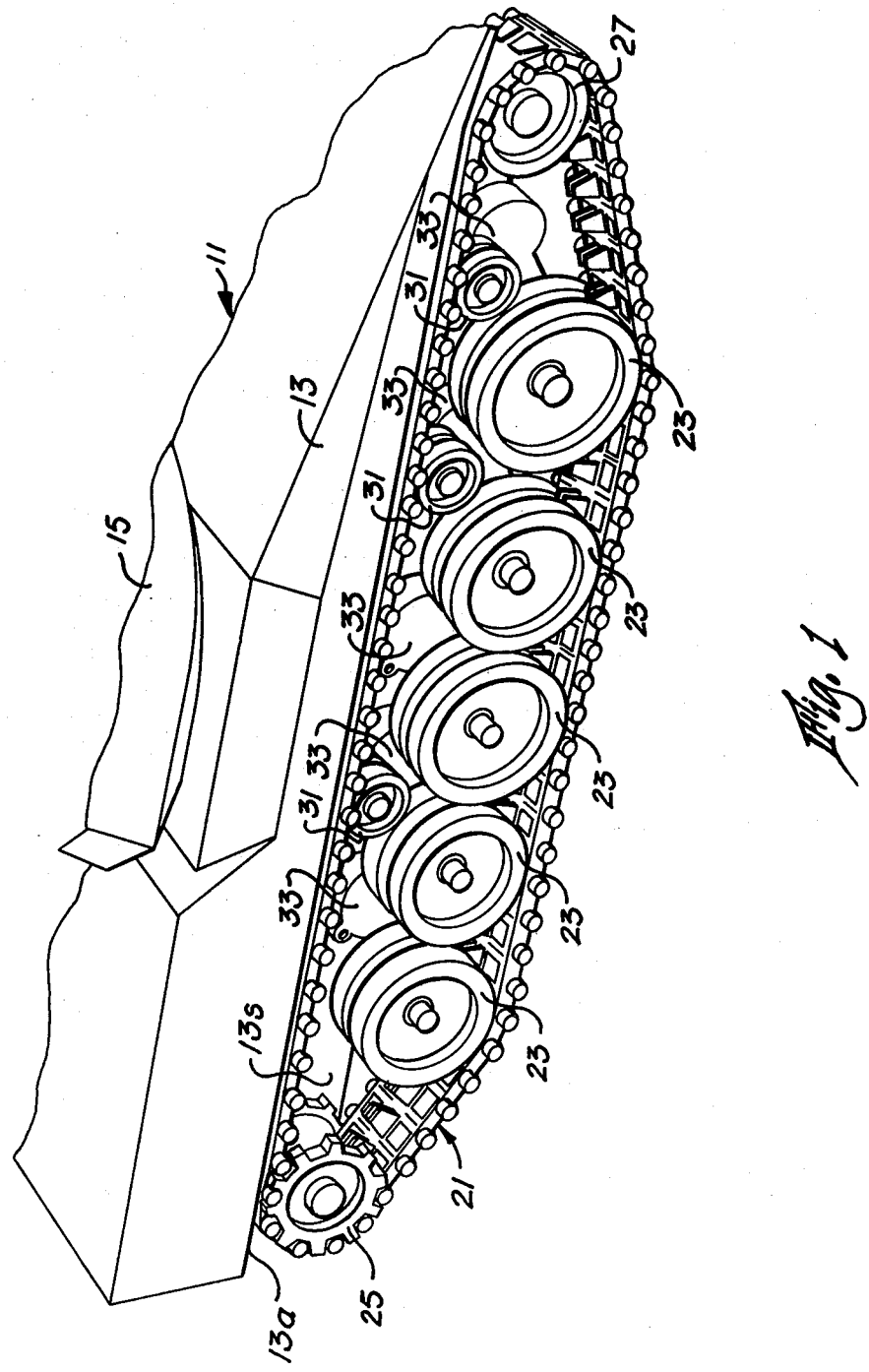
FIG. 1 is a fragmentary generalized perspective view of one side of a vehicle incorporating an embodiment of the present invention.
Figure 2:
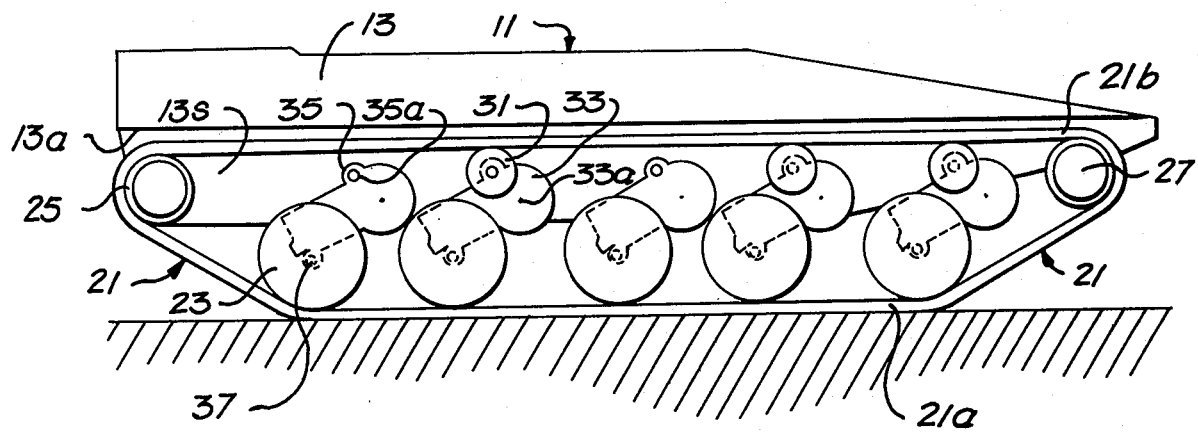
FIG. 2 is a side elevation view showing a stylized schematic representation of the track suspension arrangement of FIG. 1, with the vehicle in stopped condition on a flat surface.
Figure 3:
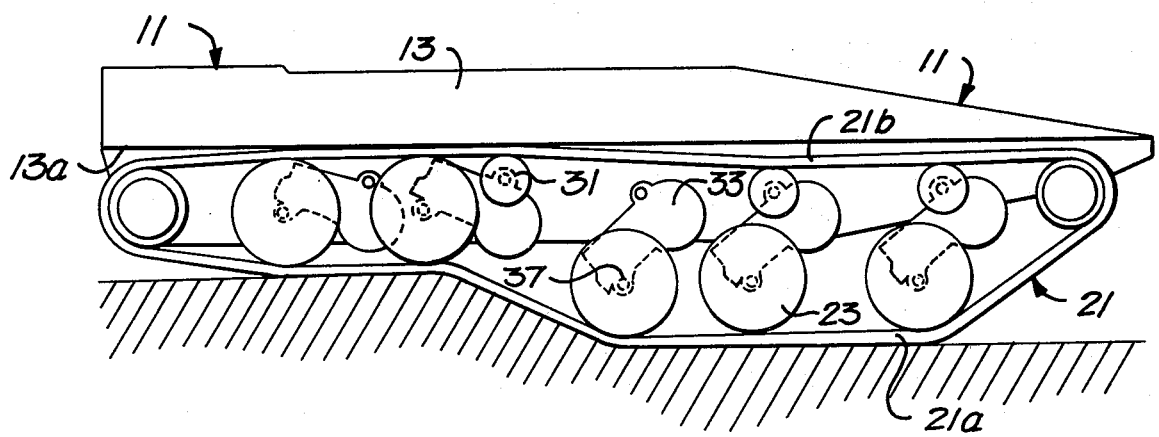
FIG. 3 is a view similar to FIG. 2, showing a stylized schematic representation of the track suspension arrangement during propulsion over an uneven terrain, with the rear two road wheels up and the front three road wheels slightly dropped for ground engagement in accommodation of the particular illustrated terrain.
Figure 4:
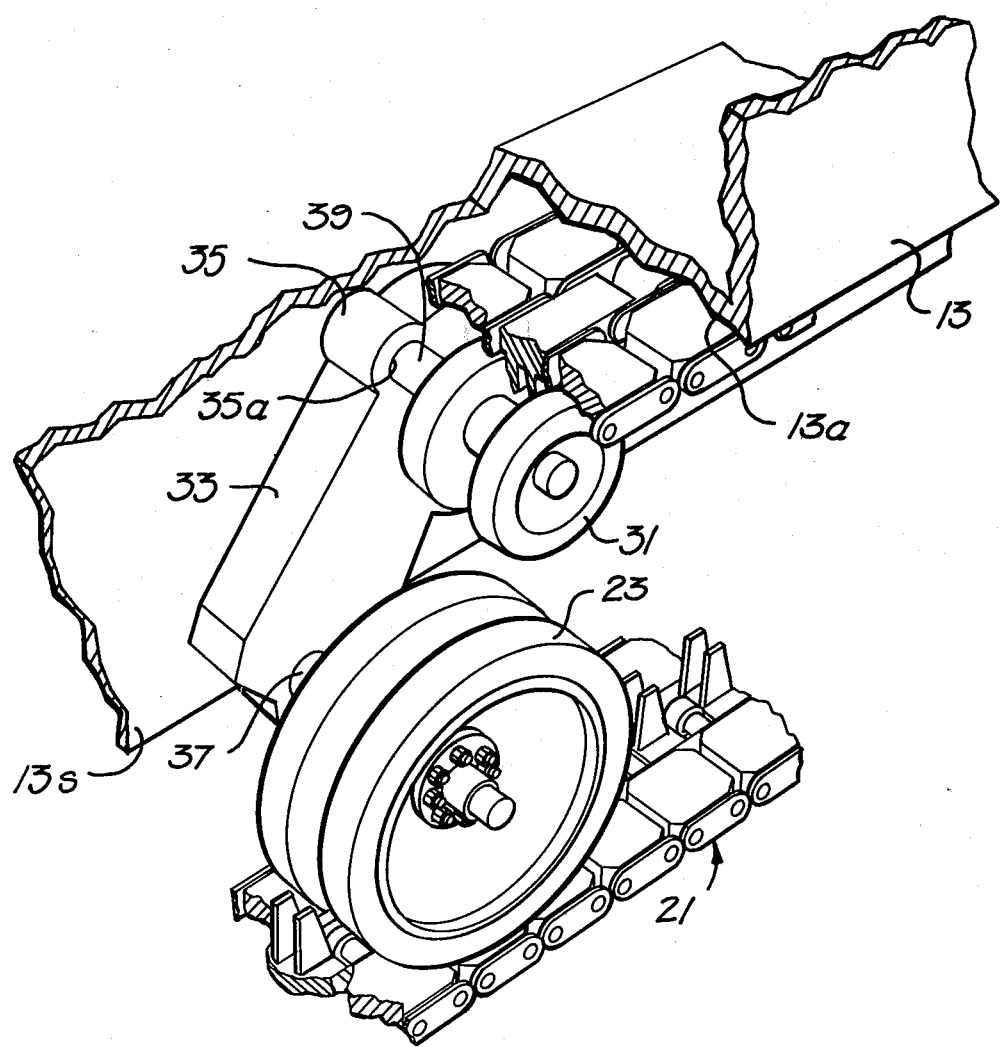
FIG. 4 is a fragmentary view, partially in section, illustrating one of the suspension arm, road wheel and return roller arrangements of FIGS. 1-3.
Figure 5:
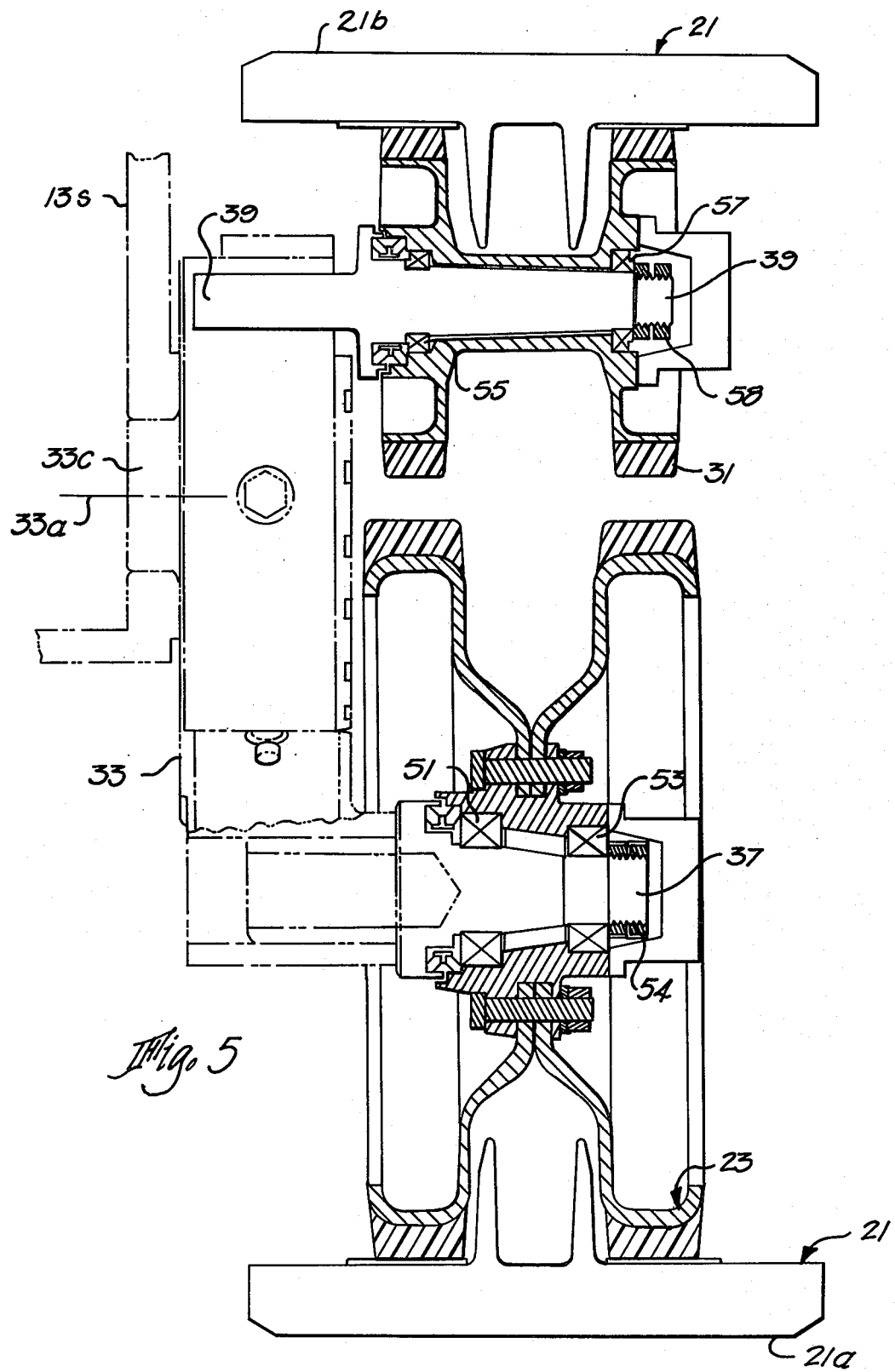
FIG. 5 is a partially phantom, partially section view of one of the suspension arm, road wheel and return roller arrangements of FIGS. 1-3, the suspension arm being shown in phantom for clarity of illustration, as the details of the suspension arm internal parts do not form a part of this invention.

Referring now to the Figures of the drawings, a tracked vehicle 11, such as an armored tank with a body or hull 13 and a turret 15, has a pair of continuous articulated tracks 21, one on each side of the vehicle. Each track 21 is suspended between a rear drive sprocket 25 and a front idler roller 27, with road wheels 23 and return rollers 31 disposed along the respective lower and upper runs of the track 21. Drive sprockets 25 may be selectively driven in any conventional or other desired fashion and may be powered by a conventional or other desired power source (not shown) suitably carried by the vehicle 11.

Road wheels 23 are carried by suspension arms 33, being freely rotatably mounted thereon as by a respective spindle or stub shaft 37, with bearings 51, 53, and securing nuts 54.

The suspension arms 33 are each pivotally secured to the body or hull side wall 13s, with the arm pivot axis 33a in suitably spaced relation beneath the sponson 13a which extends out over the upper return run 21b of the track 21, so as to accommodate desired up and down pivotal motion of the suspension arms as the track passes over differing contoured terrain as in the usual tracked vehicle arrangement and operation.

The suspension arm may be suitably mounted on the vehicle body or hull side wall 13a as through a boss 33c which extends into a corresponding opening in the side wall 13s and which is suitably secured therewithin, the manner of securement not forming a part of this invention and thus not being shown. The suspension arm may contain resilient acting position-controlling means such as a hydropneumatic piston position-control arrangement if so desired, with a rotary bearing between the pivotal arm 33 and the mounting boss 33c, if so desired, although such construction does not itself form a part of the invention nor is such necessary for practice of the invention. Any suitably pivotally mounted suspension arm construction, including torsion spring arrangements, with or without position-control means within the arm itself, may be utilized so long as the suspension arm is arranged to accommodate mounting of a return roller thereon as next described.

Return rollers 31 are freely rotatably mounted on three of the suspension arms 33 as by a respective projecting spindle or stub shaft 39 suitably secured within a bore 35a formed in a mounting protuberance at an inboard radius position on the upper side of the respective suspension arm 33. Support bearings 55, 57 and securing nuts 58 may suitably be employed for free rotational mounting of the respective return rollers 31.

The radial distances of the return roller spindle shaft 39 and the road wheel spindle shaft 37 from the pivot axis of the suspension arm and the offset distance of the return roller shaft from the radial line between the suspension arm axis 33a and the axis of road wheel spindle shaft 37 is laid out such relative to the diameters of the road wheel 23 and the return roller 31 in conjunction with the effective track thickness and the static taut straight line spacing between the track 21 and the sponson 13a, that the road wheel 23 and its instant adjacent upper run track section bottoms out on the sponson 13a at the same upward pivoted position of the suspension arm 33 as does the return roller 31 and its instant adjacent section of upper run track 21b, or alternatively before bottoming out of the return roller 31 and adjacent upper run track section.

It has been found that it is not necessary that return rollers 31 be provided on all of the suspension arms 33, and it is not necessary to form such suspension arms 33 to accommodate return roller 31. However, in order to enable ease of interchange of parts and particularly to enable interchange of suspension arms 33 at all locations, it is a further feature that all suspension arms are provided with mounting bosses 35 and bores 35a for mounting of spindle shafts 39 and return rollers 31 thereon as may be desired for a given suspension arm location.

While the invention has been illustrated and described with respect to a particular illustrative and preferred embodiment, it will be apparent to one skilled in the art that various modifications and improvements may be made without departing from the scope or spirit of the invention. Accordingly, the invention is not to be limited by the particular embodiment, but only by the scope of the appended claims.

I claim:
1. A tracked vehicle comprising:
a vehicle body,
a continuous track for propulsion of said vehicle,
a drive sprocket in drive-engaging relation with said track carried by said body,
at least one suspension arm pivotally mounted on said body,
a road wheel rotatably mounted on and carried by said suspension arms, engaging said track along a lower traction run of said track,
and a return roller mounted on and carried by said suspension arm and mounted for engagement of the upper run of said track,
the rotational axis of said road wheel being a greater distance from the axis of said suspension arm than the axis of said return roller,
said return roller rotational axis being offset above a radial line extending between the rotational axis of said road wheel and the pivot axis of said suspension arm
said suspension arm having a lateral mounting protuberance thereon,
said return roller being carried by said protuberance,
two stub shafts carried by said suspension arm and each respectively carrying said road wheel and said return roller,
said body having a sponson extending above the return run of said track,
and said return roller and said road wheel being sized and mounting on said suspension arm such that the portion of return run track engaging said road wheel when it is moved upward engages said sponson at least as early as the portion of return run track carried by said return roller.
2. A tracked vehicle according to claim 1,
said return roller and said road wheel sizing and mounting positions on said suspension arm being such that the respective upper run track portions engaged by said return roller and said road wheel when said suspension arm is pivoted upwardly to an upper extent of travel, are caused to bottom against the lower side of said sponson substantially simultaneously.
3. A tracked vehicle according to claim 1,
said return roller and said road wheel sizing and mounting positions on said suspension arm being such that both the road wheel and the return roller cause their respectively engaged return run track sections to engage said sponson as an upper limit stop at substantially the same upward extent of travel of said suspension arm.
4. A tracked vehicle according to claim 1, further comprising
a plurality of longitudinally spaced said suspension arms pivotally mounted on said body, each with a respective road wheel and return roller mounted thereon as set forth in claim 1.
5. A tracked vehicle according to claim 4,
and at least one further pivotally mounted suspension arm carrying a road wheel without a return roller carried thereon.
6. A tracked vehicle according to claim 5,
said one further suspension arm being substantially identical to said plurality of suspension arms and having means thereon for accommodating mounting of a return roller thereon.
7. A tracked vehicle comprising:
a vehicle body,
a continuous track for propulsion of said vehicle,
a drive sprocket in drive-engaging relation with said track carried by said body,
at least one suspension arm pivotally mounted on said body,
a road wheel rotatably mounted on and carried by said suspension arm, engaging said track along a lower traction run of said track,
and a return roller mounted on and carried by said suspension arm and mounted for engagement of the upper run of said track,
said vehicle having two tracks mounted at spaced positions on opposite sides of said vehicle with a drive sprocket for each of said tracks,
each of said tracks having a suspension arm with road wheel and return roller arrangement;
the axis of said road wheel being a greater distance from the first axis of said suspension arm than the axis of said return roller,
said return roller rotational axis being offset above a radial line extending between the rotational axis of said road wheel and the pivot axis of said suspension arm,
said body having a sponson extending above the return run of said track,
said return roller and said road wheel being sized and mounted on said suspension arm such that the portion of return run track engaging said road wheel when it is moved upward engages said sponson at least as early as the portion of return run track carried by said return roller.

8. A tracked vehicle according to claim 7, said return roller and said road wheel sizing and mounting positions on said suspension arm being such that the respective upper run track portions engaged by said return roller and said road wheel when said suspension arm is pivoted upwardly to an upper extent of travel, are caused to bottom against the lower side of said sponson substantially simultaneously.

9. A tracked vehicle according to claim 7, said return roller and said road wheel sizing and mounting positions on said suspension arm being such that both the road wheel and the return roller cause their respectively engaged return run track sections to engage said sponson as an upper limit stop at substantially the same upward extent of travel of said suspension arm.

10. A tracked vehicle having a body and a continuous track for propulsion, comprising a plurality of suspension arms pivotally mounted in said body and each carrying a road wheel for engagement with the tracktion run of said track, at least one of said suspension arms also carrying a return roller for articulated engagement of the upper run of said tank, said body having a sponson extending above the return run of said track, and said return roller and said road wheel carried by said one suspension arm being sized and mounted on said suspension arm such that the portion of return run track engaging said road wheel when it is moved upward engages said sponson at least as early as the portion of return run track carried by said return roller.

11. A tracked vehicle having two continuous tracks for propulsion, one track on each of opposite sides of said body, and a suspension arm, road wheel and return roller arrangement for each of said tracks as set forth in claim 10.

* * * * *